United States Patent [19]

Bandoh et al.

[11] Patent Number: 4,520,441
[45] Date of Patent: May 28, 1985

[54] DATA PROCESSING SYSTEM

[75] Inventors: Tadaaki Bandoh, Ibaraki; Hidekazu Matsumoto, Hitachi; Yasushi Fukunaga, Hitachi; Ryosei Hiraoka, Hitachi; Jushi Ide, Mito; Tetsuya Kawakami, Hitachi, all of Japan

[73] Assignees: Hitachi, Ltd.; Hitachi Engineering Co., Ltd., both of Tokyo, Japan

[21] Appl. No.: 329,949

[22] Filed: Dec. 11, 1981

[30] Foreign Application Priority Data

Dec. 15, 1980 [JP] Japan .................. 55-175863
Mar. 13, 1981 [JP] Japan .................. 56-35347

[51] Int. Cl.³ .................................... G06F 13/00
[52] U.S. Cl. ...................................... 364/200
[58] Field of Search .................... 364/200, 900

[56] References Cited

U.S. PATENT DOCUMENTS

| 3,723,976 | 3/1973 | Alvarez et al. | 364/200 |
| 4,040,026 | 8/1977 | Gernelle | 364/200 |
| 4,051,461 | 9/1977 | Hashlmoto et al. | 364/200 |
| 4,130,870 | 12/1978 | Schneider | 364/200 |
| 4,145,738 | 3/1979 | Inoue et al. | 364/200 |
| 4,195,340 | 3/1980 | Joyce | 364/200 |
| 4,231,088 | 10/1980 | Hammer et al. | 364/200 |
| 4,277,826 | 7/1981 | Collins et al. | 364/200 |
| 4,365,295 | 12/1982 | Katzman et al. | 364/200 |
| 4,378,588 | 3/1983 | Katzman et al. | 364/200 |

OTHER PUBLICATIONS

16-Bit Microprocessor Enters Virtual Memory Domain Lavi et al., Electronics/Apr. 24, 1980.

Primary Examiner—Gareth D. Shaw
Assistant Examiner—Jameson Lee
Attorney, Agent, or Firm—Antonelli, Terry & Wands

[57] ABSTRACT

A data processing system for supporting a virtual memory is disclosed. Prior to the start of main memory write operation, a processor checks to see if a store buffer has a vacant area to store data to be written into a main memory to execute a current instruction. If a page fault occurs during the main memory write operation, the processor continues to store the subsequent write data for the current instruction and the corresponding virtual or logical addresses in the store buffer to complete execution of the current instruction.

3 Claims, 10 Drawing Figures

DATA PROCESSING SYSTEM

BACKGROUND OF THE INVENTION

The present invention relates to a data processing system for supporting a virtual memory, and more particularly to page fault processing.

Page fault processing is carried out when an accessed address is not contained in a main memory.

In page fault processing, a resumption of instruction execution after the page fault is particularly complex to implement.

When the page fault occurs during the execution of the instruction, it is desirable to resume the execution from the point at which the page fault has occurred. To this end, it is necessary to save the contents of work registers and flip-flops used in the hardware unit, carry out the page fault processing and reload the saved contents before the execution of the instruction is resumed. However, this system includes many problems because many informations are included and they differ from machine to machine.

Accordingly, the following approaches have been usually used to process the page fault.

In a first approach, an address associated with an instruction is first checked before actually accessing the memory to see if a page fault will occur and then the instruction execution is begun. This approach is simple but has the disadvantage of long execution time because the addresses of every instruction have to be checked prior to beginning the execution of the instruction.

In a second approach which is disclosed in an article entitled "16-bit microprocessor enters virtual memory domain", Electronics, Apr. 24, 1980, the input data of the instructions is retained and reloaded when a page fault occurs and the execution of the instruction is to be resumed. This approach needs a special bus and an increased overhead to retain the input data.

An undesirable characteristic which is common to both of the above approaches is that the overhead increases even when a page fault does not occur.

It is a recent trend to use high class language oriented high function instructions in a new architecture computer and to execute the various functions at a high speed by using microprograms. In such a system, it is possible for the programmer who is not familiar with a detailed operation of the hardware to write the microprograms. In the above-mentioned approaches, the programmer must write the microprograms while giving attention to the possible occurrence of the page fault. Accordingly, the chance of error is high.

SUMMARY OF THE INVENTION

It is an object of the present invention to provide a data processing system which can execute instructions at a high speed without increasing the overhead required in a process to support the page fault processing.

In accordance with a feature of the present invention, it has been noted that in executing an instruction, data is read first from a memory and then a write operation follows. It is first checked to see if a buffer has a sufficient vacant area to store the data to be written into the memory in executing the instruction, before the initiation of the write operation to the memory, and if a page fault occurs during the write operation to the memory, the subsequent unit data required by the instruction and the corresponding virtual or logical addresses are stored in the buffer.

In accordance with the above feature of the present invention, the process or checking for the occurrence of a page fault before the memory write operation is not necessary, means for retaining the input data is not necessary, and the troublesome step of saving all of the contents of the work registers and the flip-flops after the page fault has been detected is not necessary.

DESCRIPTION OF THE PREFERRED EMBODIMENTS

Figure 1:
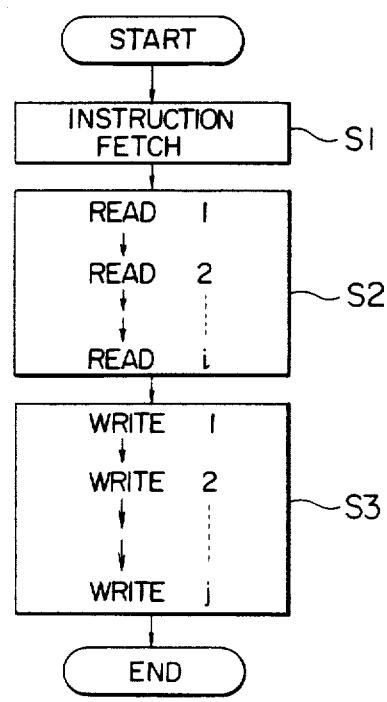
FIG. 1 shows a flow chart for instruction processing to which the present invention is applied.

Referring to FIG. 1, pertinent portions of an instruction processing flow to which the present invention is applied will be first explained. After instruction fetch (S1), a memory is read i times ($i \geq 1$), (S2). Then, data is written into the memory or a register j times ($j \geq 1$), (S3).

A page fault may occur during the memory read or memory write operation. When it occurs during the memory read operation, the instruction execution can be resumed from the beginning of the instruction because no change occurs in the input data for the instruction (the content of the memory or the content of the register specified by the instruction). If the page fault occurs during the memory write operation, the write address which caused the page fault and the associated data and the subsequent write addresses of the instruction and the associated data are stored in a separate buffer, and the execution of the instruction is deemed to be completed from the processor point of view by having the write data and addresses stored into the store buffer. The content of the buffer is temporarily stored in a work area of the main memory, and when a page containing the corresponding write addresses is loaded into the memory, the content of the work area is written back into the buffer prior to the data being written into the page now in memory.

Figure 2:
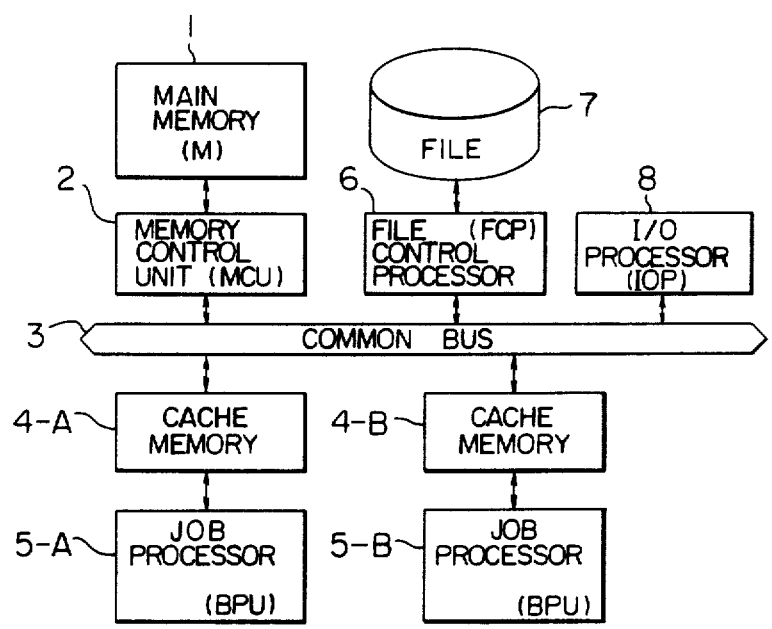
FIG. 2 shows the overall configuration of a data processing system to which the present invention is applied.

FIG. 2 shows an exemplary configuration of a data processing system to which the present invention is applied. While a multi-processor configuration having cache memories 4A and 4B and an address translator 2 arranged inversely to that of a conventional computer system is shown, the present invention can be equally applied to a single-processor configuration having a conventionally arranged address translator.

User programs are executed in job processors 5A and 5B and the instructions and the data are transferred between a file 7 and an I/O processor (IOP) 8 through a main memory (M) 1 and a file control processor (FCP) 6.

A memory control unit (MCU) 2 has an address translator for translating a virtual address to a physical address. If the main memory 1 contains a portion corresponding to the virtual address, the virtual address is translated to the physical address and the corresponding memory area is accessed. If the main memory 1 does not contain the corresponding portion, a page fault signal is sent back to the job processor (BPU) 5A or 5B through a common bus 3, as will be discussed later.

Figure 3:
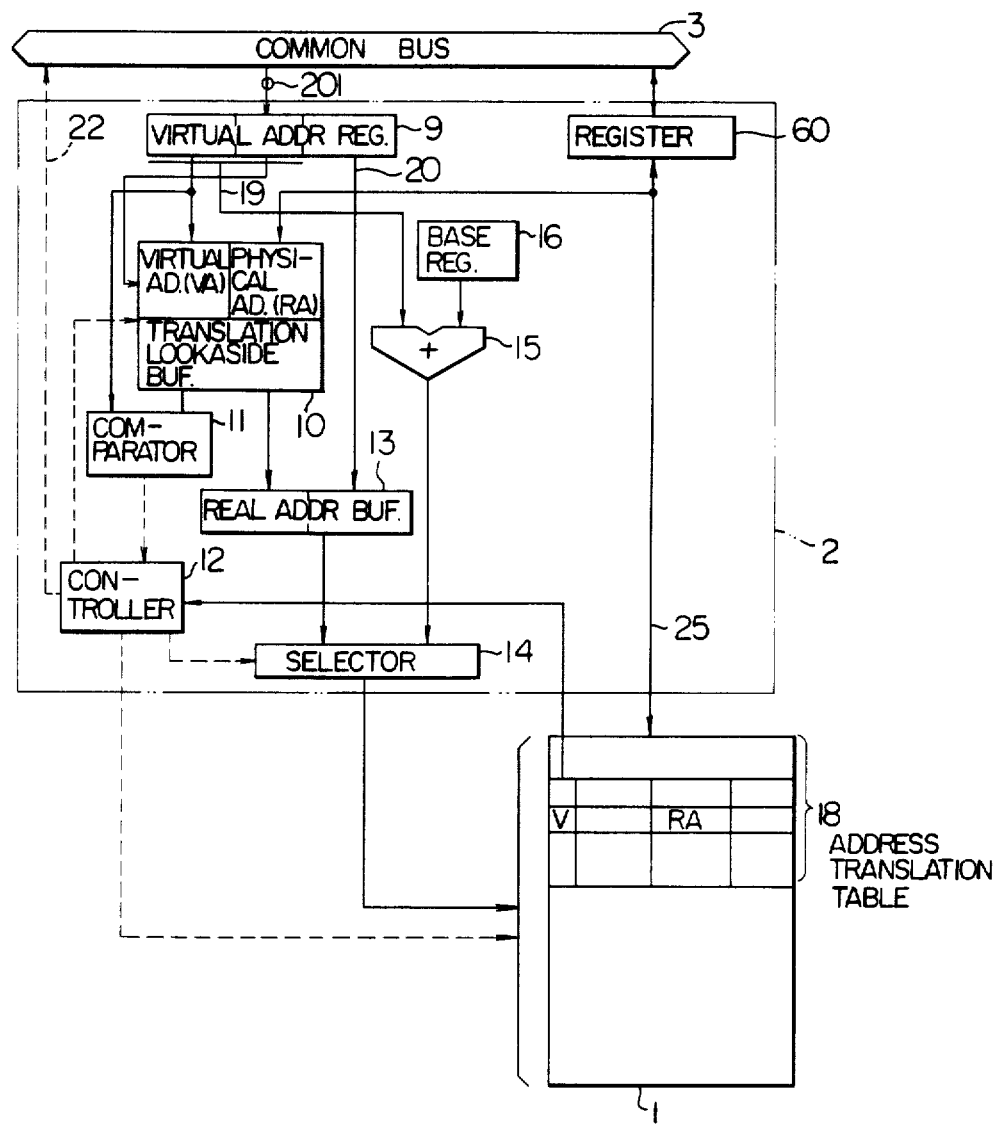
FIG. 3 shows an example of an address translator which translates a virtual address to a physical address.

FIG. 3 shows a block diagram of the address translator in the memory control unit 2 of FIG. 2.

Since the address translator is not directly related to the present invention, only the elements needed to understand the present invention are explained. A virtual address register 9 stores a virtual address sent from the processor through the common bus 3 and a signal line 201. The virtual address consists of a page address field 19 and an interpage address field 20. A translation lookaside buffer (TLB) 10 stores pairs of virtual and physical addresses relating to the data stored in main memory. A comparator 11 compares the virtual address VA stored in the TLB 10 with a portion of the page address field 19 and supplies a hit (compare equal) or miss (compare not equal) signal to a controller 12.

In case of a hit, the real address RA read out of the TLB 10 and the interpage address field 20 are supplied to a real address buffer 13 to produce a physical address, which is then transferred to the main memory 1 through a selector (SEL) 14.

In case of a miss, the content of a base register 16 and the page address field 19 are added in an adder 15 in order to access an address translation table 18 stored in the main memory 1. By accessing the translation table 18, a physical address is read into the TLB 10 through a data line 25. The translation table 18 contains V bits for indicating if the corresponding pages are contained in the main memory 1. If the corresponding page is not contained in the main memory 1, a page fault signal 22 is generated and transferred to the requesting processor. A register 60 is used to exchange data between the main memory 1 and the common bus 3.

While various address translation systems are known, any system can be used with the present invention provided that it carries out the required virtual-physical translation and has a function to issue a page fault signal when the corresponding page is not contained in the main memory.

Figure 4:
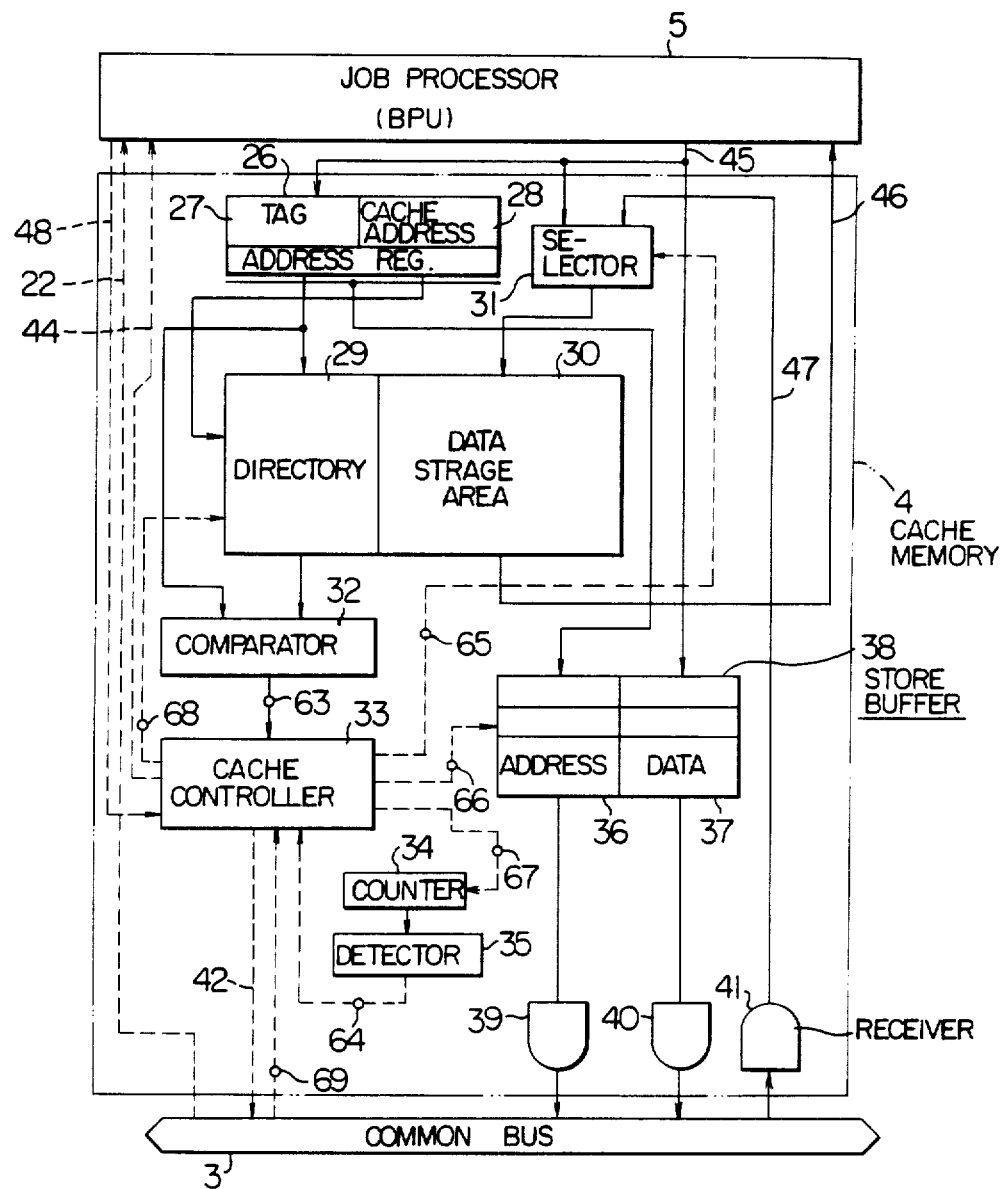
FIG. 4 shows the configuration of a cache memory having a store buffer which is a characteristic of the present invention.

FIG. 4 shows the configuration of a cache memory having a store buffer which is a characteristic of the present invention and corresponds to the cache 4A or 4B shown in FIG. 2.

The cache memory stores the most recently used data so that if the processor requires the same data again that data can be rapidly accessed. In a store-through cache memory, the write operation requires a long time because the data has to be written into the main memory as well as the cache memory. In order to avoid the above shortcoming, the present invention provides a store buffer 38 and the write operation is completed only when the data is written into the store buffer 38. Such a store buffer system has been known per se.

Referring to FIG. 4, an address register 26 consists of a tag field 27 and a cache address field 28 (indicating a block address and an interblock address). The cache address field 28 is used to read a directory 29 and data 30. The directory 29 and the tag field 27 are compared by a comparator 32 which supplies a hit or miss signal to a cache controller 33. In case of a hit, the read data is transferred to the job processor 5 through a BPU read data line 46. In case of a miss, a signal 42 is supplied to the main memory and the data read out of the main memory is transferred through the common bus 3, a receiver 41 and a selector 31 and is stored in the data storage area 30 at the address specified by the address field 28. The data is further transferred to the job processor through the data line 46. At the same time, the content of the tag field 27 is stored in the directory 29 at the address specified by the address field 28. When a page fault occurs, it is transferred to the processor 5 through the signal line 22.

The memory read operation has been thus far explained. The memory write operation is next explained. An address and write data are sent from the processor through a line 45. If the corresponding block is contained in the cache memory, the incoming data is stored in the data storage area 30 at the address specified by the address field 28. Irrespective of the presence or absence of the corresponding block, the pair consisting of the write address and the write data is stored in an address buffer 36 and a data buffer 37 of the store buffer 38. When the data has been stored in the store buffer 38, the processor takes it as the completion of the write operation and procedes to the next process. In this manner, the high speed operation is attained in the memory write operation. The write data stored in the store buffer 38 is sequentially transferred to the main memory through drivers 39 and 40 when the common bus 3 is free.

The store buffer 38 is controlled by a counter 34, a detector 35 and the cache controller 33. The counter 34 indicates the number of words stored in the store buffer 38.

Figure 5:
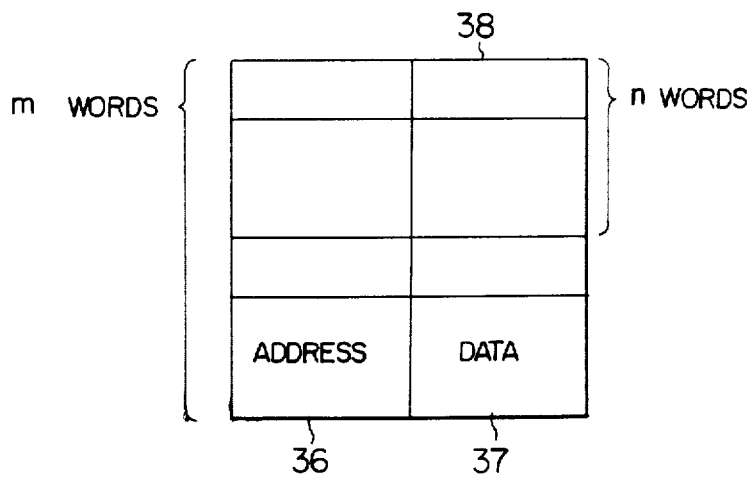
FIG. 5 shows the configuration of the store buffer of FIG. 4.

The store buffer 38 may be configured as shown in FIG. 5. Referring to FIG. 5, the store buffer 38 has a capacity to store m words of memory addresses and data. Of the m words, n (n<m) words are used, when a page fault occurs during the memory write operation, to store the subsequent memory write data for the instruction being executed and the associated addresses.

Figure 6:
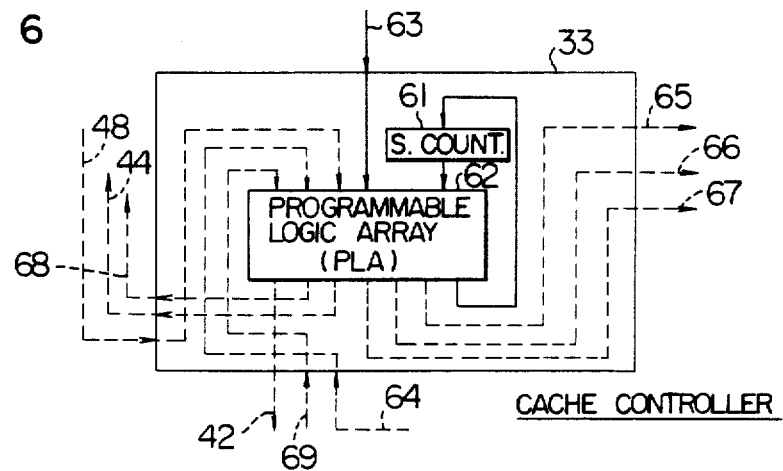
FIG. 6 shows the cache controller of FIG. 4.

The cache controller (CCONT) 33 may be configured as shown in FIG. 6. It comprises a stage counter (SCNT) 61 and a programmable logic array (PLA) 62. The SCNT 61 is a conventional counter and the PLA 62 may be as shown in "SIGNETICS bipolar & MOS memory data manual" printed in U.S.A., January 1979, p 156.

The operation of the CCONT 33 is explained below.

When the CCONT 33 receives a memory write start signal 48 initiating the data transfer operation from the processor, the PLA 62 produces an output 67 to cause its counter 34 to increment the content by one. On the other hand, when the CCONT 33 receives a signal from the common bus 3 informing it of the end of a main memory write operation through the signal line 69, it signals the counter 34 through the signal line 67 to decrement its content by one. The detector 35 checks to see if there are n or more words of vacant area in the buffer 38 and informs the CCONT 33 as to the check result through a signal line 64. The number n indicates the number of memory write operations for one instruction. The purpose of checking n is to assure that the execution of the instruction can be completed once the write operation for the instruction has started. If the data bus width for the memory write operation is no more than two times as wide as the write data width, more than one write operation may be needed to write each data. Accordingly, the number n should be determined bearing the above in mind.

When the memory write start signal 48 is received, a signal is produced on a signal line 66 to store the write data and the addresses in the store buffer 38.

In the memory read operation, if the requested data is not contained in the data storage area 30 of the cache memory and the data is read out of the main memory 1, a signal line 65 controls the selector 31 to select the data received by the receiver 41 to store the data in the data storage area 30. A signal line 68 controls the data storage area 30 and the directory 29 to store the data and the address.

In the memory write operation, the signal line 68 controls the directory 29 and the data storage area 30 to store the write data and the address and the signal line 65 controls the selector 31 to select the data on the signal line 45.

A wait signal 44 is produced in response to the check result 64 from the detector 35 to instruct the processor to suspend the execution of the microinstruction. The processor responds to the wait signal 44 to control the instruction execution sequence.

As explained above in connection with FIG. 1, in accordance with the present invention, the memory read operation precedes the memory write operation. When a page fault occurs during the read operation, the instruction execution is retried from the beginning as will be explained later. When a page fault occurs during the write operation, all of the memory write data for the instruction is stored in the store buffer 38. Before the execution of each instruction is started, the store buffer 38 is checked to see if it has n or more words of vacant area. If it does not have n or more words of vacant area, the execution of the instruction is suspended. If it has, the execution of the instruction is started. This is controlled by the wait signal 44.

Figure 7:
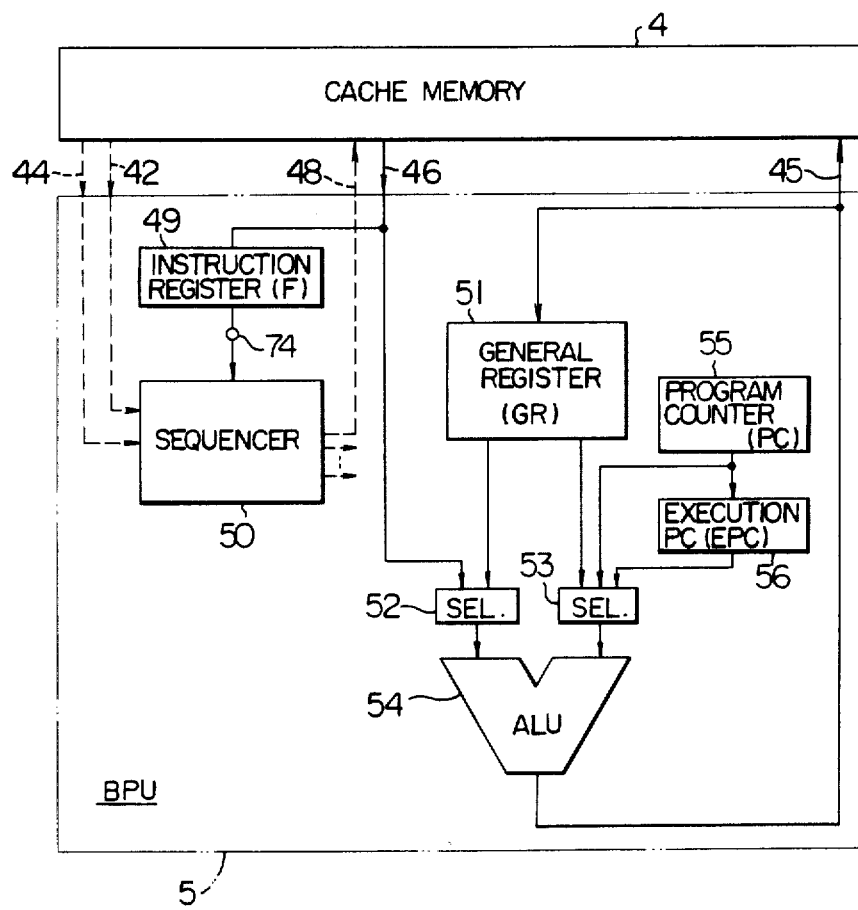
FIG. 7 shows the configuration of the job processor.
Figure 8:
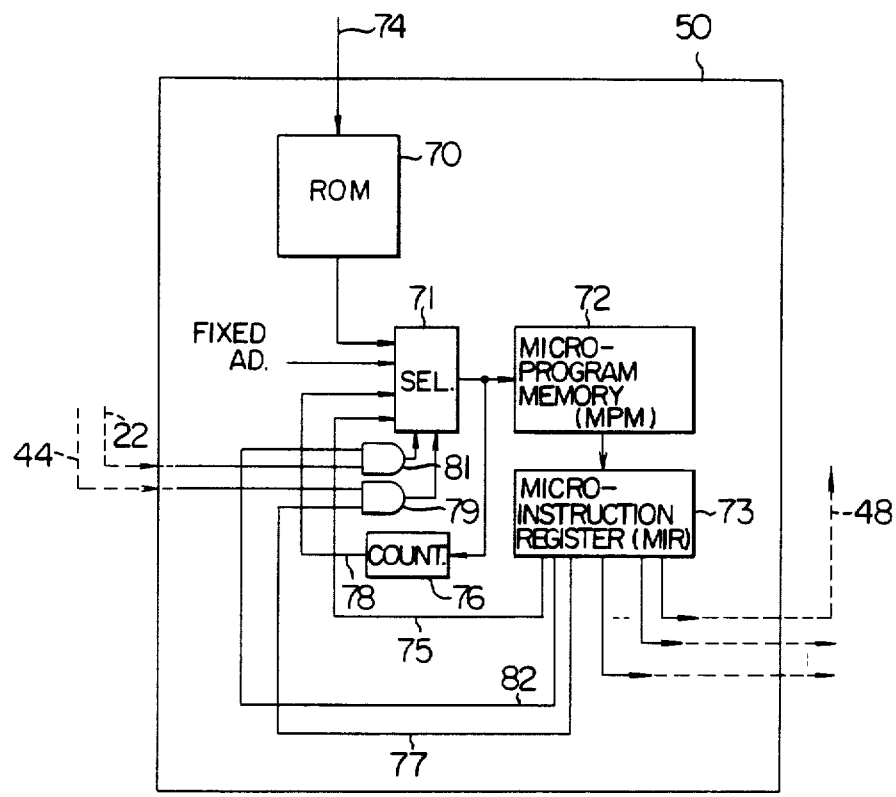
FIG. 8 shows a specific embodiment of the sequencer of FIG. 7.

FIG. 7 shows the configuration of the processor, FIG. 8 shows a block diagram of the sequencer 50 and FIG. 9 shows a flow chart for the operation of FIGS. 7 and 8. The operation of the processor is explained below with reference to those drawings.

Referring to FIG. 7, the instruction is stored in an instruction register (F) 49. A sequencer 50 responds to the instruction to control a general register 51, an arithmetic and logic unit (ALU) 54 and selectors 52 and 53 to execute a sequence necessary for the execution of the instruction. A program counter 55 indicates an address of the instruction to be executed next and a register 56 indicates an address of the instruction currently being executed. At the start of the instruction execution, the content of the program counter 55 is transferred to the register 56.

The sequencer 50 usually controls the instruction execution sequence under the control of a microprogram. FIG. 8 shows a block diagram of the sequencer 50 which employs a well-known microprogram control system. In response to an output 74 from the intruction register 49, a leading microprogram address for the instruction is read out of a read-only memory (ROM) 70 and it is supplied to a microprogram memory (MPM) 72 through a selector (SEL) 71 to read out a microinstruction corresponding to the address read out of the ROM 70. A partial output 75 of a microinstruction register (MIR) 73 which indicates the next address or an output 78 of a counter 76 is used to address the MPM 72 to read out the next microinstruction. In this manner, the microinstructions are sequentially executed. In order to check for the occurrence of a page fault, the page fault signal 22 is checked by a signal line 82 and a gate 81 under the control of the microprogram, and if the page fault is detected, the selector 71 selects a fixed address 1 of the microprogram for processing the page fault so that the microprogram of the corresponding address is read out of the MPM 72 and loaded into the MIR 73. Then the contents of the registers are saved.

In order to check for the wait signal 44 by the microinstruction, a signal line 77 requests the check and this signal is ANDed with the wait signal 44 in a gate 79. Depending on the check result, the selector 71 selects the next address.

Figure 9B:
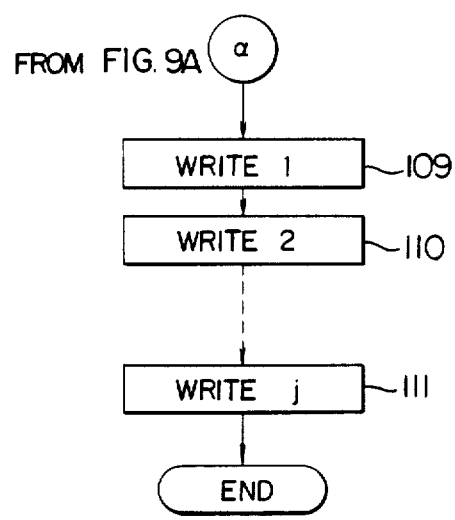
FIGS. 9A and 9B show flow charts of the instruction processing in accordance with the present invention.
Figure 9A:
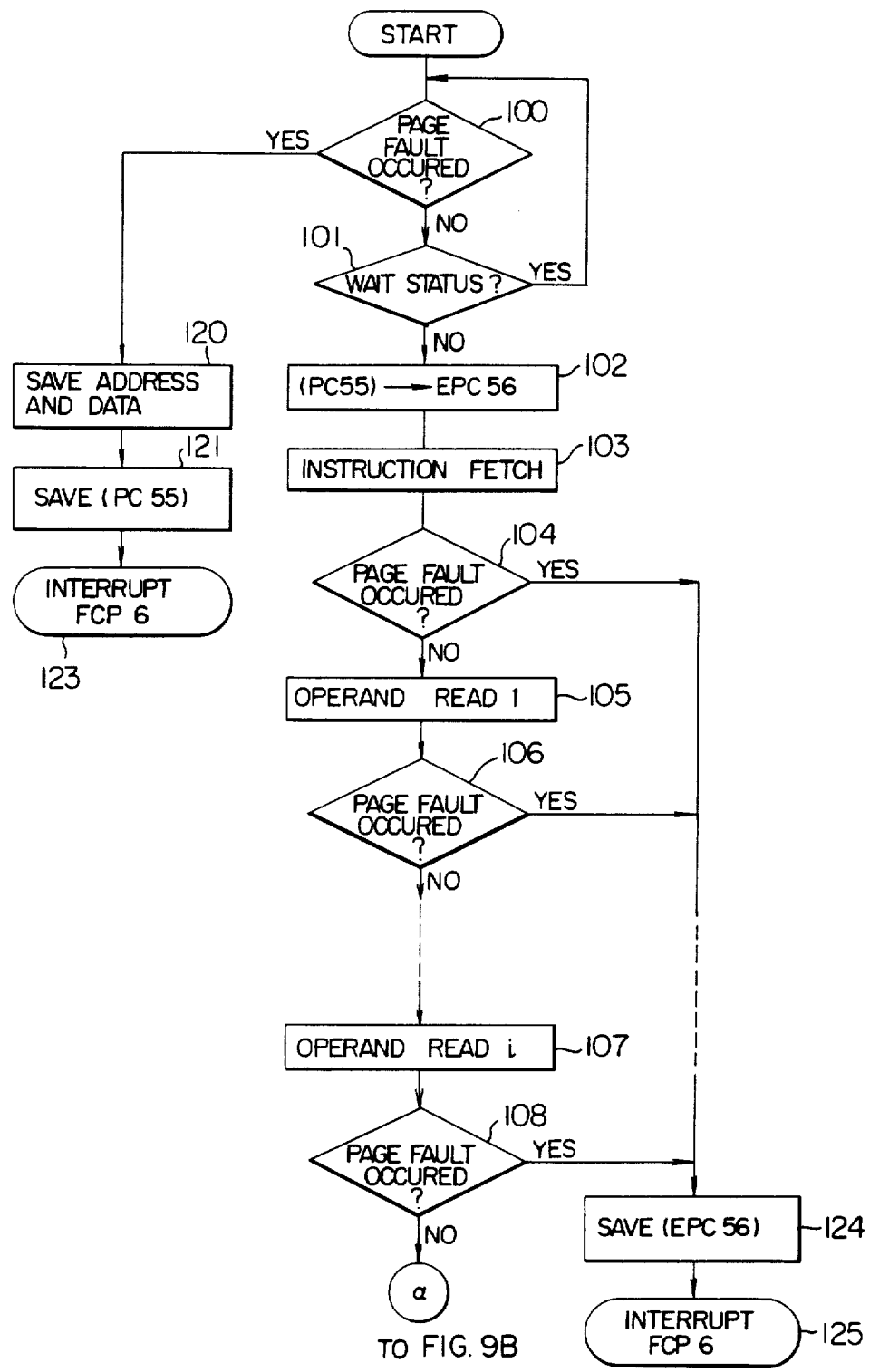

Referring to FIGS. 9A and 9B, the instruction execution process is now explained.

In a step 100, the page fault signal 22 is checked by the sequencer 50. In the case of absence of a page fault, the wait signal 44 is checked in a step 101. In the case of a wait status, the process goes back to the step 100, and when the wait status terminates the process proceeds to a step 102. In the step 102, the content of the program counter 55 (which indicates the address of the instruction to be now executed) is loaded into the register 56. In a step 103, the instruction is fetched, and the presence or absence of the page fault is checked in a step 104. If a page fault is detected, the instruction execution is interrupted and the content of the register 56 is saved in a step 124, and an interruption request for processing the page fault is issued to the FCP 6 in a step 125. If a page fault is not detected, an operand is read out in a step 105 and the presence or absence of a page fault is checked in a step 106. In a step 107, the last operand is read out, and if a page fault is not detected in a step 108, the write operation is started.

When a page fault occurs during the memory read operation, the FCP 6 loads the page which caused the page fault into the main memory 1 after the step 125. After the loading, the processor resumes the execution of the instruction of the saved address (that is, the instruction which caused the page fault) from the first step of that instruction.

The write operation is repeated a number of times equal to the number of write data, as shown by steps 109, 110, . . . 111. When a page fault occurs during the write operation, the page fault signal 22 is produced and the write operation is continued until the execution of the current instruction is completed by storing the write data and the address in the store buffer 38. After the execution of the instruction, the page fault signal 22 produced previously is detected in the first step 100 for the next instruction. In steps 120 and 121, the sequencer 50 saves the pair of address and data stored in the store buffer 38 and the content of the program counter 55 by storing this information in the work area of the main memory 1. In a step 123, an interruption request for processing the page fault is issued to the processor 5, which causes the FCP 6 respond to the interruption request to load the necessary page into the main memory 1. After the loading, when the processor resumes the execution of the program, the saved address and data are transferred back to the store buffer 38 and the data in the store buffer 38 is written into the main memory 1 and the address of the instruction next to the instruction subjected to the page fault is loaded into the register 56 to resume the execution from the next instruction.

As is seen from the above explanation, in the present embodiment, a store buffer 38 is provided and the store buffer 38 is checked to see if it has a vacant area of sufficient size to store the address and the data necessary to complete the execution of an instruction before the execution of the instruction is started. If a page fault occurs during the memory read operation, the instruction execution is resumed from the beginning of the current instruction, and if the page fault occurs during the write operation, the content of the store buffer 38 is saved after the completion of the execution of the current instruction so that the page fault is processed with a small overhead.

Some instructions may instruct to read or write a large volume of data such as a string process. In order to provide the store buffer having a capacity large enough to store the data to allow the completion of the execution of such an instruction, an increased amount of hardware is required. However, since such instruction uses sequential areas of the main memory 1, it is not necessary to check the page fault at every memory read or write operation. Accordingly, the conventional technique, that is, the check of the page fault before the execution of the instruction can be used with a small overhead. Accordingly, the present invention may be used for instructions which have a small number of main memory write operations and are randomly distributed and the conventional technique may be used for the instructions which use a series of memory areas.

Since the necessary size of the vacant area in the store buffer may differ from instruction to instruction, the criterion of the check for the vacant area may be changed for each instruction or a maximum size for all of the instructions may be used as the criterion.

When a page fault occurs, all data stored in the store buffer 38 may be saved, or only the remainder may be saved. The necessary size of the vacent area in the store buffer 38 may be checked at the start of the execution of the instruction or at any time point before the memory write operation is started.

We claim:

1. A data processing system for supporting a virtual memory comprising:
    (a) a main memory and an external memory for storing data by page;
    (b) a processor including means for providing virtual addresses for reading and writing data from or into said main memory in the process of executing read and write instructions;
    (c) means including a buffer connected to said processor and responsive to a memory write start signal therefrom for storing temporarily in said buffer both said virtual addresses specified by a write instruction being executed by said processor and data from said processor to be written into a page of said main memory at physical addresses corresponding to said specified virtual addresses and for writing successively said data from said buffer into said page of said main memory at said physical addresses;
    (d) an address translator connected between said main memory and said buffer for translating said virtual addresses received from said buffer to said physical addresses and including means for producing a page fault signal to said processor when the desired page into which said data is to be written is not contained in said main memory at the time of said address translation; and
    (e) wherein said processor includes means for temporarily sending all virtual addresses and data relating to the execution of a given write instruction to said buffer, means for temporarily writing said virtual addresses and data from said buffer into a work area of said main memory in response to a page fault signal, means for effecting the loading of said desired page into said main memory from said external memory in response to the page fault signal and means for loading said virtual addresses and data from said work area into said buffer to write that data in said page loaded in said main memory at the physical addresses corresponding to the virtual addresses also stored in said buffer.

2. A data processing system according to claim 1 further comprising check means connected to said buffer for checking to see if said buffer has a vacant storage area larger than the amount of both memory write data and addresses associated with the execution of a write instruction and means responsive to said check means for interrupting said processor from initiating the execution of a write instruction until sufficient vacant storage area is available in said buffer for the addresses and data provided by that write instruction.

3. A data processing system according to claim 1 wherein said processor further includes a program counter, a register connected to said program counter for storing an address received from said program counter of an instruction to be executed, and means for storing the address stored in said register into a work area in said main memory in response to said page fault signal and, after said desired page is loaded into said main memory and said data stored in said buffer is written into said loaded page for loading the content of said program counter into said register.

* * * * *